United States Patent
Gahleitner et al.

(10) Patent No.: US 9,695,308 B2
(45) Date of Patent: Jul. 4, 2017

(54) SOFT BOTTLES

(71) Applicant: Borealis AG, Vienna (AT)

(72) Inventors: Markus Gahleitner, Neunhofen/Krems (AT); Klaus Bernreitner, Linz (AT); Katja Klimke, Linz (AT); Martina Sandholzer, Linz (AT)

(73) Assignee: Borealis AG (AT)

( * ) Notice: Subject to any disclaimer, the term of this patent is extended or adjusted under 35 U.S.C. 154(b) by 316 days.

(21) Appl. No.: 14/395,352

(22) PCT Filed: Apr. 19, 2013

(86) PCT No.: PCT/EP2013/058175
§ 371 (c)(1),
(2) Date: Oct. 17, 2014

(87) PCT Pub. No.: WO2013/160203
PCT Pub. Date: Oct. 31, 2013

(65) Prior Publication Data
US 2015/0072095 A1    Mar. 12, 2015

(30) Foreign Application Priority Data

Apr. 23, 2012 (EP) .................................. 12165223

(51) Int. Cl.
| | | |
|---|---|---|
| C08L 23/16 | (2006.01) | |
| C08L 23/10 | (2006.01) | |
| C08L 23/14 | (2006.01) | |
| C08F 210/06 | (2006.01) | |

(52) U.S. Cl.
CPC ............ *C08L 23/16* (2013.01); *C08F 210/06* (2013.01); *C08L 23/10* (2013.01); *C08L 23/142* (2013.01); *C08L 2203/10* (2013.01); *C08L 2205/02* (2013.01); *C08L 2205/025* (2013.01); *C08L 2205/03* (2013.01); *C08L 2207/02* (2013.01); *C08L 2207/04* (2013.01); *Y10T 428/1397* (2015.01)

(58) Field of Classification Search
CPC ........ C08L 23/16; C08L 23/10; C08L 23/142; C08L 2205/02; C08L 2205/025; C08L 2205/03; C08L 2203/10; C08L 2207/02; C08L 2207/04; Y10T 428/1397; C08F 210/06

See application file for complete search history.

(56) References Cited

FOREIGN PATENT DOCUMENTS

| | | |
|---|---|---|
| CN | 1803909 A | 7/2006 |
| EP | 1801156 A1 | 6/2007 |
| EP | 2319885 A1 | 5/2011 |
| EP | 2410007 A1 | 1/2012 |
| EP | 2415831 A1 | 2/2012 |
| EP | 2452957 A1 | 5/2012 |
| EP | 2452959 A1 | 5/2012 |
| EP | 2452975 A1 | 5/2012 |
| WO | 2008141934 A1 | 11/2008 |
| WO | 2010149549 A1 | 12/2010 |
| WO | 2012093099 A1 | 7/2012 |

OTHER PUBLICATIONS

Chinese Office Action dated Oct. 30, 2015.

*Primary Examiner* — Michael C Miggins
(74) *Attorney, Agent, or Firm* — Tarolli, Sundheim, Covell & Tummino LLP

(57) ABSTRACT

Molded article comprising a propylene copolymer having a xylene cold soluble content (XCS) in the range of 35 to 60 wt.-% and a comonomer content in the range of 7.0 to 17.0 wt-%, wherein further the propylene copolymer fulfills inequation (I), wherein Co (total) is the comonomer content [wt.-%] of the propylene copolymer Co (XCS) is the comonomer content [wt.-%] of the xylene cold soluble fraction (XCS) of the propylene copolymer.

$$\frac{Co\ (\text{total})}{Co\ (XCS)} \geq 0.50 \qquad (I)$$

14 Claims, No Drawings

SOFT BOTTLES

The present invention is directed to new molded articles, like blow molded articles comprising a soft propylene copolymer.

Polymers are increasingly used in different demanding applications. At the same time there is a continuous seek for tailored polymers which meet the requirements of these applications. The demands can be challenging, since many polymer properties are directly or indirectly interrelated. For instance, heterophasic systems are known for their good impact behavior. Such heterophasic propylene copolymers comprise a matrix being either a propylene homopolymer or a random propylene copolymer in which an elastomeric copolymer is dispersed. Thus the polypropylene matrix contains (finely) dispersed inclusions being not part of the matrix and said inclusions contain the elastomeric copolymer. The term "inclusion" accordingly indicates that the matrix and the inclusion form different phases within the heterophasic system, said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

A specific soft heterophasic propylene copolymer is described in WO 2008/141934 A1. This heterophasic propylene copolymer has a rather low melting temperature and low stiffness.

However in the field of blow molded articles good optical properties are required.

Beside the optical properties also impact is very important for the performance of a blow molded article, like a bottle. Higher impact enables that such articles show good drop test behavior. Further the material shall be rather soft while keeping the amount of hexane extractables rather low. Further it is desired that these properties remain on a high level also after sterilization.

Accordingly it is the object of the present invention to provide molded articles being soft, though, and having low amount of hexane extractables while having also good optical properties. A further object is that the mechanical as well as optical properties remain on a high level after sterilization.

The finding of the present invention is that the molded article must comprise propylene copolymer with rather high comonomer content and xylene cold soluble (XCS) content, wherein the xylene cold soluble fraction is featured by an exceptional high propylene content, i.e. with a propylene content of at least 80 wt.-%.

Accordingly, in a first embodiment the present invention is directed to a molded article comprising a propylene copolymer, wherein the molded article and/or the propylene copolymer has/have (a) a xylene cold soluble content (XCS) determined according ISO 16152 (25° C.) in the range of 35 to 60 wt.-%, (b) a comonomer content in the range of 7.0 to 17.0 wt.-%, wherein further the molded article and/or the propylene copolymer fulfill(s) inequation (I)

$$\frac{Co \text{ (total)}}{Co \text{ (XCS)}} \geq 0.5$$

wherein

Co (total) is the comonomer content [wt.-%] of the molded article and/or of the propylene copolymer, Co (XCS) is the comonomer content [wt.-%] of the xylene cold soluble fraction (XCS) of the molded article and/or of the propylene copolymer.

Preferably the comonomer content of xylene cold soluble (XCS) fraction of the molded article and/or of the propylene copolymer according to the first embodiment is in the range of 8.0 to 20.0 wt.-%.

In a second embodiment of the present invention the molded article comprises a propylene copolymer, wherein the molded article and/or the propylene copolymer has/have (a) a xylene cold soluble content (XCS) determined according ISO 16152 (25° C.) in the range of 35 to 60 wt.-%, (b) a comonomer content in the range of 7.0 to 17.0 wt.-%, wherein further the comonomer content of xylene cold soluble (XCS) fraction of the molded article and/or of the propylene copolymer is in the range of 8.0 to 20.0 wt.-%.

Preferably, the molded article and/or the propylene copolymer according to the second embodiment fulfill(s) inequation (I)

$$\frac{Co \text{ (total)}}{Co \text{ (XCS)}} \geq 0.5$$

wherein

Co (total) is the comonomer content [wt.-%] of the molded article and/or of the propylene copolymer Co (XCS) is the comonomer content [wt.-%] of the xylene cold soluble fraction (XCS) of the molded article and/or of the propylene copolymer.

It has surprisingly been found that such molded articles are very soft, tough, and contain low amounts of hexane extractables. Further the mechanical and optical properties of the bottles remain on a high level also after sterilization.

In the following the first and second embodiment are defined in more detail together.

Molded Article

Preferably the molded article according to this invention is a blow molded article (extrusion blow molded, injection blow molded or injection stretch blow molded), like an extrusion blow molded article.

As mentioned above essential component of the molded article is the propylene copolymer as defined herein. Accordingly the main component of the molded article is the propylene copolymer as defined in the instant invention. "Main component" according to this invention indicates that this component must be present in the molded article in at least 50 wt.-% based on the total weight of the molded article. Accordingly the molded article may comprise further components, like other polymers, however not in an amount exceeding 50 wt.-%. In one preferred embodiment the molded article of the instant invention comprises the propylene copolymer as defined herein as the only polymer component. Thus the molded article may comprise typical additives, like antioxidants or colorants, but no further polymer other than the propylene copolymer of the invention.

Accordingly in a preferred embodiment the present invention is directed to a molded articles, preferably to a blow molded article, more preferably to extrusion blow molded article, comprising at least 50 wt.-%, preferably at least 70 wt.-%, more preferably comprising at least 80 wt.-%, yet more preferably comprising at least 90 wt.-%, still more preferably comprising at least 95 wt.-%, still yet more preferably comprising at least 99 wt.-%, of the propylene copolymer, i.e. the heterophasic propylene copolymer (RAHECO), as defined in more detail below. In one preferred embodiment the molded article, preferably the blow molded article, more preferably the extrusion blow molded article, consists of the propylene copolymer, i.e. consists of the heterophasic propylene copolymer (RAHECO), as defined in more detail below. In one specific embodiment the blow molded article is a blow molded bottle, like an extrusion blow molded bottle.

The applied processes for the manufacture of moulded articles are within the knowledge of the skilled person. Reference is made to the polypropylene handbook, Nello Pasquini, $2^{nd}$ edition, Hanser. For instance, in the extrusion blow molding (EBM) process a polymer melt is first extruded through a tubular die into air forming a polymer tube, subsequently blowing up said polymer tube (typically called "parison" in this technical field) until the outside of the tube reaches the boundaries of the mold. To cover the wall of the mold fully with the blown up polymer tube is rather difficult compared to injection molding because the air between polymer tube and mold has to be removed totally which is a demanding process step. Further the inside of the polymer tube is not in contact with the mold and therefore there is only little possibility to influence the inner surface structure of the tube. As a consequence thereof extrusion blown molded articles, like bottles, normally show inferior optical properties compared to any injection molded articles. For instance, the surface property inside and/or outside of extrusion blown bottles is typically non-uniform (flow lines, melt fracture) leading to lower overall gloss and transparency compared to injection molded bottles or injection stretched blown molded articles (ISBM).

Typically the molded article (bottle), preferably the blow molded articles (bottle), more preferably to extrusion blow molded articles (bottle), has a wall thickness in the range of 0.1 to 1.0 mm.

Further it is preferred that the molded article shows the same properties as the propylene copolymer as defined in detail below. This holds in particular true in case the propylene copolymer is the only polymer in the molded article. Thus with regard to the melt flow rate, the comonomer type, total comonomer content, comonomer content in the xylene cold soluble (XCS) fraction, total amount of xylene soluble fraction (XCS), the melting temperature, the inequations (I) and (II), the intrinsic viscosity of the xylene soluble fraction (XCS), the same values and ranges are applicable for the molded article as described for the propylene copolymer.

Propylene Copolymer

The propylene copolymer comprises apart from propylene also comonomers. Preferably the propylene copolymer comprises apart from propylene ethylene and/or $C_4$ to $C_{12}$ α-olefins. Accordingly the term "propylene copolymer" according to this invention is understood as a polypropylene comprising, preferably consisting of, units derivable from
(a) propylene
and
(b) ethylene and/or $C_4$ to $C_{12}$ α-olefins.

Thus the propylene copolymer according to this invention comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the propylene copolymer according to this invention comprises, especially consists of, monomers copolymerizable with propylene from the group consisting of ethylene, 1-butene and 1-hexene. More specifically the propylene copolymer of this invention comprises—apart from propylene—units derivable from ethylene and/or 1-butene. In a preferred embodiment the propylene copolymer according to this invention comprises units derivable from ethylene and propylene only.

Additionally it is appreciated that the propylene copolymer preferably has a rather high total comonomer content which contributes to the softness of the material. Thus it is required that the comonomer content of the propylene copolymer is at least 7.0 wt.-%, preferably in the range of 7.0 to 17.0 wt.-%, more preferably in the range of 7.0 to 15.0 wt.-%, yet more preferably in the range of 8.0 to 14.0 wt.-%, still more preferably in the range of 9.0 to 13.5 wt.-%.

The propylene copolymer of the instant invention can be further defined by the amount of comonomers within the xylene cold soluble (XCS) fraction versus the comonomer content of the total propylene copolymer. Accordingly it is preferred that the propylene copolymer fulfills inequation (I), more preferably inequation (Ia), yet more preferably inequation (Ib), still more preferably inequation (Ic), $$\frac{Co\ (total)}{Co\ (XCS)} \geq 0.50, \tag{I}$$

$$\frac{Co\ (total)}{Co\ (XCS)} \geq 0.60, \tag{Ia}$$

$$1.0 \geq \frac{Co\ (total)}{Co\ (XCS)} \geq 0.50, \tag{Ib}$$

$$1.0 \geq \frac{Co\ (total)}{Co\ (XCS)} \geq 0.60, \tag{Ic}$$

wherein
Co (total) is the comonomer content [wt.-%] of the propylene copolymer
Co (XCS) is the comonomer content [wt.-%] of the xylene cold soluble fraction (XCS) of the propylene copolymer.

Accordingly it is preferred that the comonomer content in the xylene cold soluble fraction (XCS) of the propylene copolymer is rather moderate. Thus it is appreciated that the comonomer content of the xylene cold soluble fraction (XCS) of the propylene copolymer is equal or below 25.0 wt.-%, preferably equal or below 20.0 wt.-%, more preferably in the range of 8.0 to 20.0 wt.-%, yet more preferably in the range of 10.0 to 19.0 wt.-%, still more preferably in the range of 12.0 to 18.0 wt.-%.

Concerning the comonomers present in the xylene cold soluble fraction (XCS) it is referred to the information provided for the propylene copolymer. Accordingly in a specific embodiment the xylene cold soluble fraction (XCS) comprises, especially consists of, monomers copolymerizable with propylene from the group consisting of ethylene, 1-butene and 1-hexene. More specifically the xylene cold soluble fraction (XCS) comprises—apart from propylene— units derivable from ethylene and/or 1-butene. In a preferred embodiment the xylene cold soluble fraction (XCS) comprises units derivable from ethylene and propylene only.

Another characteristic feature of the instant propylene copolymer is its rather high xylene cold soluble (XCS) fraction. Accordingly it is appreciated that the propylene copolymer has a xylene cold soluble fraction of at least 35 wt.-%, more preferably in the range of 35 to 60 wt.-%, still more preferably in the range of 35 to 55 wt.-%, yet more preferably in the range of 37 to 55 wt.-%.

Further it is appreciated that the xylene cold soluble (XCS) fraction of the propylene copolymer is specified by its intrinsic viscosity. A low intrinsic viscosity (IV) value reflects a low weight average molecular weight. For the present invention it is required that the xylene cold soluble fraction (XCS) of propylene copolymer has preferably an intrinsic viscosity (IV) of equal or below 2.8 dl/g, more preferably in the range of 1.5 to below 2.8 dl/g, still more preferably in the range of 1.8 to below 2.6 dug, yet more preferably like in the range of 2.0 to 2.5 dl/g.

Preferably it is desired that the propylene copolymer is thermomechanically stable, so that for instance a thermal sterilization process can be accomplished. Accordingly it is appreciated that the propylene copolymer has a melting temperature of at least 145° C., more preferably in the range of 145 to 160° C., still more preferably in the range of 150 to 159° C., like in the range of 151 to 159° C.

The propylene copolymer according to this invention is further featured by a rather low melt flow rate $MFR_2$ (230° C.). Accordingly the propylene copolymer has a melt flow rate $MFR_2$ (230° C.) in the range of more than 0.5 to 2.5 g/10 min, more preferably in the range of more than 0.5 to 2.0 g/10 min, still more preferably in the range of 0.6 to 2.0 g/10 min, yet more preferably in the range of 0.7 to 2.0 g/10 min.

Further it is preferred that the propylene copolymer has a flexural modulus of not more than 350 MPa, more preferably in the range of 100 to 350 MPa, more preferably in the range of 150 to 300 MPa.

With regard to the optical properties it is preferred that the propylene copolymer has
(a) a haze measured on an injection molded specimen of 1 mm thickness before sterilization of below 35%, more preferably below 30%, still more preferably 15 to below 35%, yet more preferably 20 to 30%, and/or
(b) a haze measured on an injection molded specimen of 1 mm thickness after sterilization of below 55%, more preferably below 50%, still more preferably 25 to below 55%, yet more preferably 35 to 50%.

Further the propylene copolymer of the instant invention is featured by its low amount of extractables. Accordingly it is preferred that the propylene copolymer has a hexane soluble content of below 15.0 wt.-%, more preferably in the range of 2.5 to 15.0 wt.-%, still more preferably in the range of 5.0 to 13.0 wt.-%.

As indicated above, the instant propylene copolymer is featured by a rather high amount of a xylene cold soluble (XCS) fraction. On the other hand the propylene copolymer is also preferably featured by a rather high melting temperature. Accordingly the instant propylene copolymer is a mixture of a crystalline polymer and amorphous material. Such type of polymer is classified as heterophasic propylene copolymer. A heterophasic propylene copolymer comprises a polymer matrix, like a (semi)crystalline polypropylene, in which the amorphous material, like an elastomeric propylene copolymer, is dispersed. Thus in a preferred embodiment the instant propylene copolymer is heterophasic propylene copolymer (RAHECO). More precisely the instant propylene copolymer is heterophasic propylene copolymer (RAHECO) comprising a matrix (M) being a random propylene copolymer (R-PP) and dispersed therein an elastomeric propylene copolymer (E). Thus the matrix (M) contains (finely) dispersed inclusions being not part of the matrix (M) and said inclusions contain the elastomeric propylene copolymer (E). The term inclusion indicates that the matrix (M) and the inclusion form different phases within the heterophasic propylene copolymer (RAHECO), said inclusions are for instance visible by high resolution microscopy, like electron microscopy or scanning force microscopy.

Preferably the heterophasic propylene copolymer (RAHECO) according to this invention comprises as polymer components only the random propylene copolymer (R-PP) and the elastomeric propylene copolymer (E). In other words the heterophasic propylene copolymer (RAHECO) may contain further additives but no other polymer in an amount exceeding 5 wt.-%, more preferably exceeding 3 wt.-%, like exceeding 1 wt.-%, based on the total heterophasic propylene copolymer (RAHECO). One additional polymer which may be present in such low amounts is a polyethylene which is a by-reaction product obtained by the preparation of heterophasic propylene copolymer (RAHECO) (see in detail below). Accordingly it is in particular appreciated that the instant heterophasic propylene copolymer (RAHECO) contains only the random propylene copolymer (R-PP), the elastomeric propylene copolymer (E) and optionally polyethylene in amounts as mentioned in this paragraph.

Preferably the weight ratio between the matrix (M), i.e. the random propylene copolymer (R-PP), and the elastomeric propylene copolymer (E) is 50/50 to 80/20, more preferably 60/40 to 77/23, yet more preferably 62/38 to 75/25.

In the following the random propylene copolymer (R-PP) and the elastomeric propylene copolymer (E) are defined more precisely.

The random propylene copolymer (R-PP) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP) according to this invention comprises, especially consists of, monomers copolymerizable with propylene from the group consisting of ethylene, 1-butene and 1-hexene. More specifically the random propylene copolymer (R-PP) of this invention comprises—apart from propylene—units derivable from ethylene and/or 1-butene. In a preferred embodiment the random propylene copolymer (R-PP) comprises units derivable from ethylene and propylene only.

The comonomer content of the random propylene copolymer (R-PP) is at least 4.0 wt.-%, more preferably at least 6.0 wt.-%, still more preferably in the range of 4.0 to 15.0 wt.-%, yet more preferably in the range of 6.0 to 12.0 wt.-%, still more preferably in the range of 7.0 to 11.0 wt.-%.

Further it is appreciated that the propylene copolymer fulfills inequation (II), more preferably inequation (IIa), yet more preferably inequation (IIb), still more preferably inequation (IIc), still yet more preferably inequation (IId), $$\frac{Co\ (total)}{Co\ (RPP)} \geq 0.9, \tag{II}$$

$$\frac{Co\ (total)}{Co\ (RPP)} \geq 1.0, \tag{IIa}$$

$$2.0 \geq \frac{Co\ (total)}{Co\ (RPP)} \geq 0.9, \tag{IIb}$$

$$1.9 \geq \frac{Co\ (total)}{Co\ (RPP)} \geq 1.0, \tag{IIc}$$

$$1.7 \geq \frac{Co\ (total)}{Co\ (RPP)} \geq 1.1, \tag{IId}$$

wherein
Co (total) is the comonomer content [wt.-%] of the propylene copolymer,

Co (RPP) is the comonomer content [wt.-%] of the random propylene copolymer (R-PP).

The term "random" indicates that the comonomers of the random propylene copolymer (R-PP), as well as of the first propylene copolymer fraction (R-PP1) and the second propylene copolymer fraction (R-PP2) are randomly distributed within the propylene copolymers. The term random is understood according to IUPAC (Glossary of basic terms in polymer science; IUPAC recommendations 1996).

Due to the rather high comonomer content of the matrix (M), i.e. of the random propylene copolymer (R-PP), the matrix (M) has a considerable amount of xylene cold solubles. Thus it is preferred that the amount of the xylene cold soluble (XCS) fraction of the matrix (M), i.e. of the random propylene copolymer (R-PP), is equal or more than 20 wt.-%, more preferably is in the range of 20 to 45 wt.-%, still more preferably is in the range of 25 to 43 wt.-%, yet more preferably is in the range of 30 to 42 wt.-%.

The random propylene copolymer (R-PP) preferably has a melt flow rate $MFR_2$ (230° C.) in the range of 0.3 to 5.0 g/10 min. In one embodiment the melt flow rate $MFR_2$ (230° C.) of the random propylene copolymer (R-PP) is in the range of 0.3 to 3.0 g/10 min, preferably in the range of 0.3 to 2.5 g/10 min, more preferably in the range of 0.5 to 2.0 g/10 min, like in the range of 0.5 to 1.0 g/10 min.

The random propylene copolymer (R-PP) preferably comprises at least two polymer fractions, like two or three polymer fraction, all of them are propylene copolymers. Even more preferred the random propylene copolymer (R-PP) comprises, preferably consists of, a first propylene copolymer fraction (R-PP1) and a second propylene copolymer fraction (R-PP2). It is preferred that the first propylene copolymer fraction (R-PP1) is the comonomer lean fraction whereas the second propylene copolymer fraction (R-PP2) is the comonomer rich fraction.

Thus it is preferred that the first random propylene copolymer fraction (R-PP1) has a comonomer content of equal or below 5.0 wt.-%, more preferably of equal or below 4.0 wt.-%, yet more preferably in the range 0.5 to 5.0 wt.-%, still more preferably in the range 0.5 to 4.0 wt.-%, like in the range of 1.0 to 3.5 wt.-%.

As the comonomer of the first random propylene copolymer fraction (R-PP1) preferably is rather low, also its xylene cold soluble (XCS) is comparably low. Thus it is preferred that the amount of the xylene cold soluble (XCS) fraction of the first random propylene copolymer fraction (R-PP1) is equal or below than 12.0 wt.-%, more preferably is in the range of 3.0 to 12.0 wt.-%, still more preferably is in the range of 4.0 to 11.0 wt.-%, yet more preferably is in the range of 5.0 to 10.0 wt.-%.

On the other hand the second random propylene copolymer fraction (R-PP2) preferably has a comonomer content of at least 7.0 wt.-%, more preferably in the range 7.0 to 20.0 wt.-%, still more preferably in the range 9.0 to 19.0 wt.-%, yet more preferably in the range 10.0 to 18.0 wt.-%.

The comonomers of the first random propylene copolymer fraction (R-PP1) and second random propylene copolymer fraction (R-PP2), respectively, copolymerizable with propylene are ethylene and/or $C_4$ to $C_{12}$ α-olefins, in particular ethylene and/or $C_4$ to $C_8$ α-olefins, e.g. 1-butene and/or 1-hexene. Preferably the first random propylene copolymer fraction (R-PP1) and second random propylene copolymer fraction (R-PP2), respectively, comprise, especially consist of, monomers copolymerizable with propylene from the group consisting of ethylene, 1-butene and 1-hexene. More specifically the first random propylene copolymer fraction (R-PP1) and second random propylene copolymer fraction (R-PP2), respectively, comprise—apart from propylene—units derivable from ethylene and/or 1-butene. In a preferred embodiment the first random propylene copolymer fraction (R-PP1) and the second random propylene copolymer fraction (R-PP2) comprise the same comonomers, i.e. ethylene only.

Preferably the weight ratio between the first random propylene copolymer fraction (R-PP1) and the second random propylene copolymer fraction (R-PP2) is 20/80 to 80/20, more preferably 30/70 to 70/30.

As mentioned above a further component of the heterophasic propylene copolymer (RAHECO) is the elastomeric propylene copolymer (E) dispersed in the matrix (M), i.e. in the random propylene copolymer (R-PP). Concerning the comonomers used in the elastomeric propylene copolymer (E) it is referred to the information provided for the heterophasic propylene copolymer (RAHECO) and the random propylene copolymer (R-PP), respectively. Accordingly the elastomeric propylene copolymer (E) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the elastomeric propylene copolymer (E) comprises, especially consists of, monomers copolymerizable with propylene from the group consisting of ethylene, 1-butene and 1-hexene. More specifically the elastomeric propylene copolymer (E) comprises—apart from propylene—units derivable from ethylene and/or 1-butene. Thus in an especially preferred embodiment the elastomeric propylene copolymer (E) comprises units derivable from ethylene and propylene only. It is especially preferred that the random propylene copolymer (R-PP) and the elastomeric propylene copolymer (E) comprises the same comonomers. Accordingly in one specific embodiment the random propylene copolymer (R-PP) and the elastomeric propylene copolymer (E) comprise propylene and ethylene only.

The comonomer content of the elastomeric propylene copolymer (E) preferably is not more than 25.0 wt.-%, more preferably not more than 22 wt.-%, still more preferably in the range of 10.0 to 22.0 wt.-%, yet more preferably in the range of 12.0 to 20.0 wt.-%.

The propylene copolymer, i.e. the heterophasic propylene copolymer (RAHECO), as defined in the instant invention may contain up to 1.0 wt.-% additives, like nucleating agents and antioxidants, as well as slip agents and antiblocking agents.

The instant propylene copolymer, i.e. the heterophasic propylene copolymer (RAHECO), is preferably obtained by a specific process. Accordingly the instant propylene copolymer, i.e. the heterophasic propylene copolymer (RAHECO), is preferably obtained by a sequential polymerization process comprising the steps of (a) polymerizing in a first reactor (R1)
    propylene and
    ethylene and/or a C4 to C12 α-olefin, preferably ethylene,
        obtaining a first polymer fraction, i.e. a first random propylene copolymer fraction (R-PP1),
(b) transferring the first polymer fraction, i.e. the first random propylene copolymer fraction (R-PP1), into a second reactor (R2),
(c) polymerizing in said second reactor (R2) in the presence of the first polymer fraction, i.e. of the first random propylene copolymer fraction (R-PP1), propylene and
    ethylene and/or a C4 to C12 α-olefin, preferably ethylene,
        obtaining a second polymer fraction, i.e. a second random propylene copolymer fraction (R-PP2), the first and second polymer fraction form a first mixture, i.e. the random propylene copolymer (R-PP), (d) transferring said first mixture, the random propylene copolymer (R-PP), into a third reactor (R3), (e) polymerizing in said third reactor (R3) in the presence of the first mixture, i.e. the random propylene copolymer (R-PP), propylene and
ethylene and/or a C4 to C12 α-olefin, preferably ethylene, obtaining a third polymer fraction, said third polymer fraction is preferably the first fraction of the elastomeric propylene copolymer (E); the third polymer fraction and the first mixture, i.e. the random propylene copolymer (R-PP), form a second mixture, (f) transferring said second mixture into a fourth reactor (R4), (g) polymerizing in said forth reactor (R4) in the presence of the second mixture propylene and
ethylene and/or a C4 to C12 α-olefin, preferably ethylene, obtaining a forth polymer fraction, said forth polymer fraction is preferably the second fraction of the elastomeric propylene copolymer (E); the forth polymer fraction and the second mixture form the propylene copolymer, i.e. the heterophasic propylene copolymer (RAHECO), and (h) removing the propylene copolymer from the fourth reactor (R4).

Preferably between the second reactor (R2), the third reactor (R3) and the fourth reactor (R4) the monomers are flashed out.

The term "sequential polymerization process" indicates that the propylene copolymer, i.e. the heterophasic propylene copolymer (RAHECO), is produced in at least four reactors, preferably in four reactors, connected in series. Accordingly the present process comprises at least a first reactor (R1), a second reactor (R2), a third reactor (R3), and a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

As stated above in the first two reactors the matrix (M), i.e. the random propylene copolymer (R-PP) is produced. More precisely, in the first reactor (R1) the first random propylene copolymer fraction (R-PP1) is produced whereas in the second reactor (R2) the second random propylene copolymer fraction (R-PP2) is produced.

The preferred comonomers used in the first reactor (R1) are the same as indicated above, for the first random propylene copolymer fraction (R-PP1). Accordingly especially preferred comonomers are ethylene, 1-butene and 1-hexene. In one specific embodiment the comonomer is ethylene.

Preferably the weight ratio between the first random propylene copolymer fraction (R-PP1) and the second random propylene copolymer fraction (R-PP2) is 20/80 to 80/20, more preferably 30/70 to 70/30.

Accordingly in the first reactor (R1) a first random propylene copolymer fraction (R-PP1) is produced having a comonomer content of equal or below 5.0 wt.-%, more preferably of equal or below 4.0 wt.-%, yet more preferably in the range 0.5 to 5.0 wt.-%, still more preferably in the range 0.5 to 4.0 wt.-%, like in the range of 1.0 to 3.5 wt.-%.

In the second rector (R2) the second random propylene copolymer fraction (R-PP2) is produced obtaining thereby the random propylene copolymer (R-PP).

The preferred comonomers used in the second reactor (R2) are the same as indicated above, for the first reactor (R1). Accordingly especially preferred comonomers are ethylene, 1-butene and 1-hexene. In one specific embodiment the comonomer is ethylene.

The second random propylene copolymer fraction (R-PP2) preferably has comonomer content of at least 7.0 wt.-%, more preferably in the range 7.0 to 20.0 wt.-%, still more preferably in the range 9.0 to 19.0 wt.-%, yet more preferably in the range 10.0 to 18.0 wt.-%.

Thus the overall comonomer content in the second reactor (R2), i.e. the comonomer content of the random propylene copolymer (R-PP), is at least 4.0 wt.-%, more preferably at least 6.0 wt.-%, still more preferably in the range of 4.0 to 15.0 wt.-%, yet more preferably in the range of 6.0 to 12.0 wt.-%, still more preferably in the range of 7.0 to 11.0 wt.-%.

The comonomers of the random propylene copolymer (R-PP), of the first random propylene copolymer fraction (R-PP1), and of the second random propylene copolymer fraction (R-PP2) copolymerizable with propylene are ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP), the first random propylene copolymer fraction (R-PP1), and the second random propylene copolymer fraction (R-PP2) comprise, especially consist of, monomers copolymerizable with propylene from the group consisting of ethylene, 1-butene and 1-hexene. More specifically the random propylene copolymer (R-PP), the first random propylene copolymer fraction (R-PP1) and the second random propylene copolymer fraction (R-PP2) comprise—apart from propylene—units derivable from ethylene and/or 1-butene. In a preferred embodiment the random propylene copolymer (R-PP), the first random propylene copolymer fraction (R-PP1) and the second random propylene copolymer fraction (R-PP2) comprise the same comonomers, i.e. ethylene only.

Further the first random propylene copolymer fraction (R-PP1), i.e. the polymer of the first reactor (R1), has preferably a xylene cold soluble (XCS) fraction of equal or below than 12.0 wt.-%, more preferably in the range of 3.0 to 12.0 wt.-%, still more preferably in the range of 4.0 to 11.0 wt.-%, yet more preferably in the range of 5.0 to 10.0 wt.-%.

On the other hand the second random propylene copolymer fraction (R-PP2), i.e. the polymer produced in the second reactor (R2), preferably has a xylene cold soluble (XCS) fraction of equal or more than 20 wt.-%, more preferably in the range of 25 to 95 wt.-%, still more preferably in the range of 40 to 90 wt.-%.

Accordingly the overall xylene cold soluble (XCS) content in the second reactor, i.e. the xylene cold soluble (XCS) fraction of the random propylene copolymer (R-PP), preferably is equal or more than 20 wt.-%, more preferably is in the range of 20 to 45 wt.-%, still more preferably is in the range of 25 to 43 wt.-%, yet more preferably is in the range of 30 to 42 wt.-%.

Preferably the first random propylene copolymer fraction (R-PP1) preferably has a melt flow rate $MFR_2$ (230° C.) in the range of in the range of 0.3 to 1.9 g/10 min, more preferably in the range 0.7 to 1.5 g/10 min.

On the other hand the second random propylene copolymer fraction (R-PP2), i.e. the polymer produced in the second reactor (R2), preferably has a melt flow rate $MFR_2$ (230° C.) in the range of 0.4 to 1.0 g/10 min, more preferably in the range of 0.4 to 0.9 g/10 min.

Accordingly the overall melt flow rate $MFR_2$ (230° C.) in the second reactor, i.e. the melt flow rate $MFR_2$ (230° C.) of the random propylene copolymer (R-PP), preferably is in the range of 0.3 to 5.0 g/10 min, more preferably in the range of 0.3 to 3.0 g/10 min, yet more preferably in the range of 0.3 to 2.5 g/10 min, still more preferably in the range of 0.5 to 2.0 g/10 min like 0.5 to 1.0 g/10 min.

Thus after the second reactor (R2) the matrix (M), i.e. the random propylene copolymer (R-PP), of the propylene copolymer, i.e. the heterophasic propylene copolymer (RAHECO), is obtained. This matrix (M) is subsequently transferred in the third reactor (R3) in which the first fraction of the elastomeric propylene copolymer (E) is produced (step (e)).

The preferred comonomers used in the third reactor (R3) are the same as indicated above, for the first reactor (R1). Accordingly especially preferred comonomers are ethylene, 1-butene and 1-hexene. In one specific embodiment the comonomer is ethylene.

The obtained second mixture comprises the matrix (M) in which the first fraction of the elastomeric propylene copolymer (E) is dispersed. Said second mixture has preferably a comonomer content which is higher than the comonomer content of the second reactor (R2). Thus it is preferred that the comonomer content of the second mixture, i.e. after step (e)), is at least 8.0 wt.-%, preferably in the range of 8.0 to 18.0 wt.-%, more preferably in the range of 8.0 to 15.0 wt.-%, yet more preferably in the range of 9.0 to 14.0 wt.-%.

Another characteristic feature of the second mixture is its xylene cold soluble (XCS) content. Accordingly it is appreciated that the second mixture has xylene cold soluble (XCS) fraction of at least 30 wt.-%, more preferably of at least 35 wt.-%, still more preferably in the range of 30 to 55 wt.-%, yet more preferably in the range of 35 to 50 wt.-%, still yet more preferably in the range 38 to 50 wt.-%.

The comonomer content in the xylene cold soluble fraction (XCS) of the second mixture preferably is equal or below 20.0 wt.-%, more preferably in the range of 6.0 to 20.0 wt.-%, yet more preferably in the range of 8.0 to 18.0 wt.-%.

The xylene cold soluble (XCS) fraction of the second mixture can be further specified by its intrinsic viscosity. Accordingly the xylene cold soluble fraction (XCS) of the second mixture preferably has an intrinsic viscosity (IV) measured according to ISO 1628/1 (at 135° C. in decalin) of equal or below 2.6 dl/g, more preferably in the range of 1.5 to below 2.6 dl/g, still more preferably in the range of 1.8 to below 2.6 dl/g, yet more preferably like in the range of 2.0 to 2.5 dl/g.

In step (f) the second mixture is transferred in the fourth reactor (R4). In the fourth reactor (R4) the second fraction of the elastomeric propylene copolymer (E) is produced (step (g)).

The preferred comonomers used in the fourth reactor (R4) are the same as indicated above for the first reactor (R1). Accordingly especially preferred comonomers are ethylene, 1-butene and 1-hexene. In one specific embodiment the comonomer is ethylene.

The so obtained polymer is the propylene copolymer, i.e. the heterophasic propylene copolymer (RAHECO), of the instant invention.

Preferably the heterophasic propylene copolymer (RAHECO) after step (g) has a melt flow rate $MFR_2$ (230° C.) in the range of 0.5 to 2.5 g/10 min, preferably in the range of 0.5 to 2.0 g/10 min, more preferably in the range of 0.6 to 2.0 g/10 min, like 0.7 to 2.0 g/10 min.

It is preferred that the comonomer content of the xylene cold soluble fraction (XCS) after step (g), i.e. the comonomer content of the xylene cold soluble fraction (XCS) of the propylene copolymer, i.e. of the heterophasic propylene copolymer (RAHECO), is equal or below 25.0 wt.-%, preferably equal or below 20.0 wt.-%, more preferably in the range of 8.0 to 20.0 wt.-%, yet more preferably in the range of 10.0 to 19.0 wt.-%, still more preferably in the range of 12.0 to 18.0 wt.-%.

The total comonomer content after step (g), i.e. of the propylene copolymer (the heterophasic propylene copolymer (RAHECO)), is at least 7.0 wt.-%, preferably in the range of 7.0 to 17.0 wt.-%, more preferably in the range of 7.0 to 15.0 wt.-%, yet more preferably in the range of 8.0 to 14.0 wt.-%, still more preferably in the range of 9.0 to 13.5 wt.-%.

The polymer after step (g), i.e. the propylene copolymer (the heterophasic propylene copolymer (RAHECO)), fulfils also the inequations (I) as indicated above.

The amount of xylene cold solubles (XCS) in the second mixture and in the propylene copolymer after step (g) is more or less the same. The same holds true for the intrinsic viscosities of the respective xylene cold soluble (XCS) fractions.

Accordingly the propylene copolymer, i.e. the heterophasic propylene copolymer (RAHECO), has xylene cold soluble (XCS) fraction of at least 35 wt.-%, more preferably in the range of 35 to 60 wt.-%, still more preferably in the range of 35 to 55 wt.-%, yet more preferably in the range of 37 to 55 wt.-%.

Further the intrinsic viscosity (IV) measured according to ISO 1628/1 (at 135° C. in decalin) of the xylene cold soluble fraction (XCS) of propylene copolymer after step (g) preferably is of equal or below 2.8 dl/g, more preferably in the range of 1.5 to below 2.8 dl/g, still more preferably in the range of 1.8 to below 2.6 dl/g, yet more preferably like in the range of 2.0 to 2.5 dl/g.

Concerning the melting temperature of the propylene copolymer, i.e. of the heterophasic propylene copolymer (RAHECO), after step (g) it is referred to the information provide above.

Preferably the weight ratio between the matrix (M), i.e. the random propylene copolymer (R-PP), after step (c) and the elastomeric propylene copolymer (E) produced in the steps (e) to (g) is 50/50 to 80/20, more preferably 60/40 to 77/23, yet more preferably 62/38 to 75/25.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2), the third reactor (R3), and the fourth reactor (R4) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like loop reactor (LR), whereas the second reactor (R2), third reactor (R3) and the fourth reactor (R4) are gas phase reactors (GPR). Accordingly for the instant process at least four, preferably four polymerization reactors, namely a slurry reactor (SR), like loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the propylene copolymer, i.e. the heterophasic propylene copolymer (RAHECO), as defined above the conditions for the first reactor (R1), i.e. the slurry reactor (SR), like a loop reactor (LR), of step (a) may be as follows:

the temperature is within the range of 40° C. to 110° C., preferably between 60° C. and 100° C., 68 to 90° C.,
the pressure is within the range of 20 bar to 80 bar, preferably between 40 bar to 70 bar,
hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The condition in the third reactor (R3), preferably in the second gas phase reactor (GPR-2), and the fourth reactor (R4), preferably in the third gas phase reactor (GPR-3), are similar to the second reactor (R2).

In one embodiment of the process for producing the propylene copolymer, i.e. the heterophasic propylene copolymer (RAHECO), the residence time the first reactor (R1), i.e. the slurry reactor (SR), like a loop reactor (LR), is in the range 0.2 to 4 hours, e.g. 0.3 to 1.5 hours and the residence time in the gas phase reactors will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 0 to 50° C., preferably from 10 to 45° C., and more preferably from 15 to 40° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the propylene copolymer, i.e. the heterophasic propylene copolymer (RAHECO), is obtained by a sequential polymerization process, as described above, in the presence of a catalyst system comprising a Ziegler-Natta catalyst and optionally an external donor, preferably a catalyst system comprising three components, namely as component (i) a Ziegler-Natta procatalyst, and optionally as component (ii) an organometallic cocatalyst and as component (iii) an external donor represented by formula (IIIa) or (IIIb), preferably represented by formula (IIIa).

The process runs especially efficient by using a Ziegler-Natta catalyst system, preferably by using a Ziegler-Natta catalyst system as defined herein detail below, and a specific comonomer/propylene ratio in the second reactor (R2) and/or in the third (R3) and forth reactor (R4), respectively. Accordingly it is preferred that (a) the comonomer/propylene ratio [Co/C3], like the ethylene/propylene ratio [C2/C3], in the second reactor (R2), i.e. in step (c), is in the range of 30 to 200 mol/kmol, more preferably in the range of 40 to 150 mol/kmol, and/or
(b) the comonomer/propylene ratio [Co/C3], like the ethylene/propylene ratio [C2/C3], in the third reactor (R3), i.e. in step (e), is in the range of 100 to 200 mol/kmol, more preferably in the range of 110 to 160 mol/kmol, and/or
(c) the comonomer/propylene ratio [Co/C3], like the ethylene/propylene ratio [C2/C3], in the fourth reactor (R4), i.e. in step (g), is in the range of 100 to 200 mol/kmol, more preferably in the range of 110 to 160 mol/kmol.

In the following the used catalyst is defined in more detail.

The procatalyst used according to the invention is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

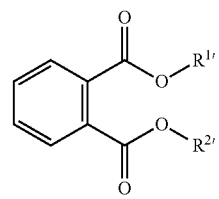

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor c) washing the product of stage b) or d) optionally reacting the product of step c) with additional $TiCl_4$ The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl, and n is 1 to 6, is contacting with $TiCl_4$ to form a titanised carrier, followed by the steps of md adding to said titanised carrier
(i) a dialkylphthalate of formula (I) with $R^{1'}$ and $R^{2'}$ being independently at least a $C_5$-alkyl, like at least a $C_8$-alkyl,
or preferably
(ii) a dialkylphthalate of formula (I) with $R^{1'}$ and $R^{2'}$ being the same and being at least a $C_5$-alkyl, like at least a $C_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product, subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol-%, of a dialkylphthalate of formula (II)

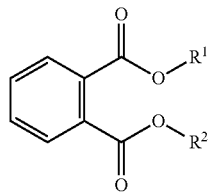

(II)

with $R^1$ and $R^2$ being methyl or ethyl, preferably ethyl, the dialkylphthalat of formula (II) being the internal donor and recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the propylene copolymer, i.e. the heterophasic propylene copolymer (RAHECO), according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by

(IIIa)

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by

(IIIb)

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor of formula (IIIb) is diethylaminotriethoxysilane.

More preferably the external donor is selected from the group consisting of diethylaminotriethoxysilane [Si(OCH$_2$CH$_3$)$_3$(N(CH$_2$CH$_3$)$_2$)], dicyclopentyl dimethoxy silane [Si(OCH$_3$)$_2$(cyclo-pentyl)$_2$], diisopropyl dimethoxy silane [Si(OCH$_3$)$_2$(CH(CH$_3$)$_2$)$_2$] and mixtures thereof. Most preferably the external donor is dicyclopentyl dimethoxy silane [Si(OCH$_3$)$_2$(cyclo-pentyl)$_2$].

The additives as stated above are added, e.g. mixed, to the propylene copolymer, i.e. to the heterophasic propylene copolymer (RAHECO).

For mixing, a conventional compounding or blending apparatus, e.g. a Banbury mixer, a t-roll rubber mill, Buss-co-kneader or a twin screw extruder may be used. The polymer materials recovered from the extruder are usually in the form of pellets. These pellets are then further processed, e.g. by molding forming process as described above.

In the following the present invention is further illustrated by means of examples.

EXAMPLES

1. Measuring Methods

The following definitions of terms and determination methods apply for the above general description of the invention as well as to the below examples unless otherwise defined. Calculation of comonomer content of the second propylene copolymer fraction (R-PP2):

$$\frac{C(PP) - w(PP1) \times C(PP1)}{w(PP2)} = C(PP2) \quad (I)$$

wherein w(PP1) is the weight fraction [in wt.-%] of the first propylene copolymer fraction (R-PP1), w(PP2) is the weight fraction [in wt.-%] of second propylene copolymer fraction (R-PP2), C(PP1) is the comonomer content [in wt.-%] of the first propylene copolymer fraction (R-PP1), C(PP) is the comonomer content [in wt.-%] of the random propylene copolymer (R-PP), C(PP2) is the calculated comonomer content [in wt.-%] of the second propylene copolymer fraction (R-PP2).

Calculation of the xylene cold soluble (XCS) content of the second propylene copolymer fraction (R-PP2):

$$\frac{XS(PP) - w(PP1) \times XS(PP1)}{w(PP2)} = XS(PP2) \quad (II)$$

wherein w(PP1) is the weight fraction [in wt.-%] of the first propylene copolymer fraction (R-PP1), w(PP2) is the weight fraction [in wt.-%] of second propylene copolymer fraction (R-PP2), XS(PP1) is the xylene cold soluble (XCS) content [in wt.-%] of the first propylene copolymer fraction (R-PP1), XS(PP) is the xylene cold soluble (XCS) content [in wt.-%] of the random propylene copolymer (R-PP), XS(PP2) is the calculated xylene cold soluble (XCS) content [in wt.-%] of the second propylene copolymer fraction (R-PP2), respectively.

Calculation of melt flow rate MFR$_2$ (230° C.) of the second propylene copolymer fraction (R-PP2):

$$MFR(PP2) = 10 \left[ \frac{\log(MFR(PP)) - w(PP1) \times \log(MFR(PP1))}{w(PP2)} \right] \quad (III)$$

wherein w(PP1) is the weight fraction [in wt.-%] of the first propylene copolymer fraction (R-PP1), w(PP2) is the weight fraction [in wt.-%] of second propylene copolymer fraction (R-PP2), MFR(PP1) is the melt flow rate MFR$_2$ (230° C.) [in g/10 min] of the first propylene copolymer fraction (R-PP1), MFR(PP) is the melt flow rate MFR$_2$ (230° C.) [in g/10 min] of the random propylene copolymer (R-PP), MFR(PP2) is the calculated melt flow rate MFR$_2$ (230° C.) [in g/10 min] of the second propylene copolymer fraction (R-PP2).

Calculation of comonomer content of the elastomeric propylene copolymer (E), respectively:

$$\frac{C(RAHECO) - w(PP) \times C(PP)}{w(E)} = C(E) \quad (IV)$$

wherein w(PP) is the weight fraction [in wt.-%] of the random propylene copolymer (R-PP), i.e. polymer produced in the first and second reactor (R1+R2), w(E) is the weight fraction [in wt.-%] of the elastomeric propylene copolymer (E), i.e. polymer produced in the third and fourth reactor (R3+R4)

C(PP) is the comonomer content [in wt.-%] of the random propylene copolymer (R-PP), i.e. comonomer content [in wt.-%] of the polymer produced in the first and second reactor (R1+R2), C(RAHECO) is the comonomer content [in wt.-%] of the propylene copolymer, i.e. is the comonomer content [in wt.-%] of the polymer obtained after polymerization in the fourth reactor (R4), C(E) is the calculated comonomer content [in wt.-%] of elastomeric propylene copolymer (E), i.e. of the polymer produced in the third and fourth reactor (R3+R4).

MFR$_2$ (230° C.) is measured according to ISO 1133 (230° C., 2.16 kg load).

Comonomer content, especially ethylene content is measured with Fourier transform infrared spectroscopy (FTIR) calibrated with $^{13}$C-NMR. When measuring the ethylene content in polypropylene, a thin film of the sample (thickness about 250 μm) was prepared by hot-pressing. The area of absorption peaks 720 and 733 cm$^{-1}$ for propylene-ethylene-copolymers was measured with Perkin Elmer FTIR 1600 spectrometer. Propylene-1-butene-copolymers were evaluated at 767 cm$^{-1}$. The method was calibrated by ethylene content data measured by $^{13}$C-NMR. See also "IR-Spektroskopie für Anwender"; WILEY-VCH, 1997 and "Validierung in der Analytik", WILEY-VCH, 1997.

Intrinsic viscosity is measured according to DIN ISO 1628/1, October 1999 (in Decalin at 135° C.).

The xylene solubles (XCS, wt.-%): Content of xylene cold solubles (XCS) is determined at 25° C. according ISO 16152; first edition; 2005-07-01.

Hexane Solubles 1 g of the sample was put into a 300 ml Erlenmeyer flask and 100 ml of hexane was added. The mixture was boiled under stirring in a reflux condenser for 4 h. The hot solution was immediately filtered through a folded filter paper N° 41 and dried (in a vacuum oven at 90° C.) and weighted (0.0001 g exactly) in a round shenk. The Erlenmeyer flask and the filter were washed with n-hexane. Then the hexane was evaporated under a nitrogen stream on a rotary evaporator. The round shenk was dried in a vacuum oven at 90° C. over night and was put into a desiccator for at least 2 hours to cool down. The shenk was weighted again and the hexane soluble was calculated therefrom.

Melting temperature ($T_m$) is measured with Mettler TA820 differential scanning calorimetry (DSC) on 5 to 10 mg samples. DSC is run according to ISO 11357-3:1999 in a heat/cool/heat cycle with a scan rate of 10° C./min in the temperature range of +23 to +210° C.

Haze was determined according to ASTM D1003-07 on 60×60×1 $mm^3$ plaques injection molded in line with EN ISO 1873-2 using a melt temperature of 200° C.

Flexural Modulus: The flexural modulus was determined in 3-point-bending at 23° C. according to ISO 178 on 80×10×4 $mm^3$ test bars injection moulded in line with EN ISO 1873-2.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature till processed further.

Description/Dimension of the Bottles 1 l bottles, having an outer diameter of 90 mm, wall thickness: 0.6 mm; overall-height of 204 mm, height of the cylindrical mantle of 185 mm Drop Test on Bottles (Bracketing)

The drop test is performed on extrusion blow moulded 1 l bottles, having an outer diameter of 90 mm, a wall thickness of 0.6 mm, an overall-height of 204 mm and a height of the cylindrical mantle of 185 mm. The bottles are filled up to their shoulder with water.

During a pre-test the estimated falling height is determined on 10 bottles.

The final test is to be performed on 20 bottles, starting at the pre-determined falling height. For each run 2 bottles are dropped.

Depending on 2 breaks or 1 break/1 no-break (=neutral) or 2 no-breaks, the next dropping height is chosen to be lower/same/higher for the next round.

The increase or decrease in height is 0.25 m, only at dropping heights <1.5 m the increase or decrease is 0.1 m.

The final drop height is determined depending on the falling heights of the containers after the first change in trend or after the first "neutral" result according following formula:

$$he=\Sigma(ni \cdot hi)/ng$$

wherein
he=50% drop height
hi=drop height
ni=number of containers dropped at the respective height
ng=total number of dropped containers
Transparency, Clarity and Haze Measurement on Bottles
  Instrument: Haze-gard plus from BYK-Gardner
  Testing: according to ASTM D1003 (as for injection molded plates)
  Method: The measurement is done on the outer wall of the bottles. The top and bottom of the bottles are cut off. The resulting round wall is then split in two, horizontally. Then from this wall six equal samples of app. 60×60 mm are cut from close to the middle. The specimens are placed into the instrument with their convex side facing the haze port. Then the transparency, haze and clarity are measured for each of the six samples and the haze value is reported as the average of these six parallels.

Tensile Test on Bottles

The top and bottom of the bottles is cut off 12 specimen according to ISO527/1B are punched along the remaining cylinder. Tensile modulus and tensile stress are then determined according to ISO 527-2, applying a traction speed of 1 mm/min for the modulus and 100 mm/min for yield strength.

2. Examples

The catalyst used in the polymerization process for the comparative and inventive examples has been produced as follows: First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As co-catalyst triethyl-aluminium (TEAL) and as donor dicyclo pentyl dimethoxy silane (D-donor) was used. The aluminium to donor ratio is indicated in table 1.

As additives 0.04 wt. % synthetic hydrotalcite (DHT-4A supplied by Kisuma Chemicals, Netherlands) and 0.15 wt % Irganox B 215 (1:2-blend of Irganox 1010 (Pentaerythrityl-tetrakis(3-(3',5'-di-tert.butyl-4-hydroxytoluyl)-propionate and tris(2,4-di-t-butylphenyl)phosphate) phosphite) of BASF AG, Germany were added to the polymers in the same step. For the production of 1 liter round bottles like used for testing in the inventive work a "Fischer Müller" Blow Molding Machine was used. The main processing parameters for the production are as follows:

Temperature profile: 180 to 200° C. applied in extruder, adapter and head
Melt temperature measured: 190 to 200° C.
Speed of extruder (revolution per minute; rpm): 13 to 16 rpm
Die gap: the die gap was adjusted to get a bottle with a weight of 40 g with Borealis grade RB307MO (random propylene copolymer with a density of 902 $kg/m^3$ and a $MFR_2$ of 1.5 g/10 min)
Cycle time: 12 to 16 seconds

TABLE 1

| Polymerization conditions | | | | |
|---|---|---|---|---|
| | | CE1 | CE2 | CE3 |
| TEAL/D Loop | [mol/mol] | 15 | 15 | 15 |
| $MFR_2$ | [g/10 min] | 2.7 | 0.9 | 1.3 |
| C2 content | [wt.-%] | 1.7 | 2.1 | 1.8 |
| XCS | [wt.-%] | 5.3 | 5.0 | 6.4 |
| C2/C3 ratio | [mol/kmol] | 3.5 | 3.4 | 3.2 |

TABLE 1-continued

Polymerization conditions

|  |  | CE1 | CE2 | CE3 |
|---|---|---|---|---|
| 1 GPR | | | | |
| $MFR_2$ | [g/10 min] | 3.7 | 1.0 | 1.0 |
| C2 content | [wt.-%] | 2.1 | 4.9 | 5.4 |
| XCS | [wt.-%] | 4.7 | 4.7 | 13.7 |
| C2/C3 ratio | [mol/kmol] | 16 | 20 | 36 |
| 2 GPR | | | | |
| $MFR_2$ | [g/10 min] | 1.8 | 1.0 | 1.3 |
| C2 content | [wt.-%] | 10.5 | 12.3 | 11.8 |
| XCS | [wt.-%] | 29 | 35 | 33 |
| C2 of XCS | [wt.-%] | 28.0 | 29.0 | 27.0 |
| IV of XCS | [dl/g] | 2.6 | 2.2 | 2.0 |
| C2/C3 ratio | [mol/kmol] | 306 | 319 | 303 |
| 3 GPR | | | | |
| $MFR_2$ | [g/10 min] | 1.2 | 1.2 | 1.3 |
| C2 content | [wt.-%] | 13.9 | 13.9 | 13.0 |
| XCS | [wt.-%] | 41 | 41 | 38 |
| C2 of XCS | [wt.-%] | 30.0 | 30.0 | 28.0 |
| IV of XCS | [dl/g] | 2.6 | 2.2 | 2.0 |
| Tm | [° C.] | 152 | 152 | 150 |
| C2/C3 ratio | [mol/kmol] | 309 | 314 | 296 |
| split loop | [wt.-%] | 28.6 | 23.6 | 24.4 |
| split GPR1 | [wt.-%] | 36.4 | 35.4 | 33.6 |
| split (GPR2 + GPR3) | [wt.-%] | 35 | 41 | 42 |
| C2 content produced in GPR1 | [wt.-%] | 2.4 | 6.8 | 8.0 |
| XCS produced in GPR1 | [wt.-%] | 4.2 | 4.5 | 19.0 |
| C2 content produced in GPR2 + GPR3 | [wt.-%] | 35.8 | 26.9 | 23.5 |

|  |  | CE4 | CE5 | E1 | E2 |
|---|---|---|---|---|---|
| TEAL/D | [mol/mol] | 15 | 15 | 15 | 15 |
| Loop | | | | | |
| $MFR_2$ | [g/10 min] | 2.3 | 1.5 | 1.0 | 1.2 |
| C2 content | [wt.-%] | 2.4 | 2.4 | 2.4 | 2.3 |
| XCS | [wt.-%] | 6.8 | 6.8 | 8.5 | 6.2 |
| C2/C3 ratio | [mol/kmol] | 3.2 | 3.7 | 3.1 | 3.2 |
| 1 GPR | | | | | |
| $MFR_2$ | [g/10 min] | 1.7 | 1.5 | 0.7 | 0.8 |
| C2 content | [wt.-%] | 6.1 | 2.4 | 8.2 | 8.6 |
| XCS | [wt.-%] | 18.4 | 4.9 | 39 | 34 |
| C2/C3 ratio | [mol/kmol] | 16 | 16 | 85 | 84 |
| 2 GPR | | | | | |
| $MFR_2$ | [g/10 min] | 1.2 | 1.6 | 0.9 | 0.8 |
| C2 content | [wt.-%] | 10.0 | 8.9 | 10.1 | 11.0 |
| XCS | [wt.-%] | 36 | 34 | 44 | 46 |
| C2 of XCS | [wt.-%] | 22.0 | 19.0 | 12.0 | 12.0 |
| IV of XCS | [dl/g] | 2.6 | 2.2 | 2.4 | 2.3 |
| C2/C3 ratio | [mol/kmol] | 177 | 188 | 145 | 132 |
| 3 GPR | | | | | |
| $MFR_2$ | [g/10 min] | 1.1 | 1.5 | 0.8 | 0.9 |
| C2 content | [wt.-%] | 9.7 | 9.4 | 10.0 | 11.5 |
| XCS | [wt.-%] | 37 | 38 | 43 | 47 |
| C2 of XCS | [wt.-%] | 22.0 | 20.0 | 16.0 | 16.0 |
| IV of XCS | [dl/g] | 3.0 | 2.4 | 2.3 | 2.3 |
| Tm | [° C.] | 150 | 151 | 153 | 152 |
| C2/C3 ratio | [mol/kmol] | 189 | 178 | 133 | 128 |
| split loop | [wt.-%] | 26.5 | 27.7 | 25.8 | 25.2 |
| split GPR1 | [wt.-%] | 36.5 | 35.3 | 42.2 | 44.8 |
| split (GPR2 + GPR3) | [wt.-%] | 37 | 37 | 32 | 30 |
| C2 content produced in GPR1 | [wt.-%] | 8.8 | 2.4 | 11.8 | 12.2 |
| XCS produced in GPR1 | [wt.-%] | 26.8 | 3.4 | 58 | 50 |
| C2 content produced in GPR2 + GPR3 | [wt.-%] | 15.8 | 21.3 | 13.8 | 18.3 |

TABLE 1b

Polymerization conditions

|  |  | CE4 | CE5 | E1 | E2 |
|---|---|---|---|---|---|
| TEAL/D | [mol/mol] | 15 | 15 | 15 | 15 |
| Loop | | | | | |
| $MFR_2$ | [g/10 min] | 2.3 | 1.5 | 1.0 | 1.2 |
| C2 content | [wt.-%] | 2.4 | 2.4 | 2.4 | 2.3 |
| XCS | [wt.-%] | 6.8 | 6.8 | 8.5 | 6.2 |
| C2/C3 ratio | [mol/kmol] | 3.2 | 3.7 | 3.1 | 3.2 |
| 1 GPR | | | | | |
| $MFR_2$ | [g/10 min] | 1.7 | 1.5 | 0.7 | 0.8 |
| C2 content | [wt.-%] | 6.1 | 2.4 | 8.2 | 8.6 |
| XCS | [wt.-%] | 18.4 | 4.9 | 39 | 34 |
| C2/C3 ratio | [mol/kmol] | 16 | 16 | 85 | 84 |
| 2 GPR | | | | | |
| $MFR_2$ | [g/10 min] | 1.2 | 1.6 | 0.9 | 0.8 |
| C2 content | [wt.-%] | 10.0 | 8.9 | 10.1 | 11.0 |
| XCS | [wt.-%] | 36 | 34 | 44 | 46 |
| C2 of XCS | [wt.-%] | 22.0 | 19.0 | 12.0 | 12.0 |
| IV of XCS | [dl/g] | 2.6 | 2.2 | 2.4 | 2.3 |
| C2/C3 ratio | [mol/kmol] | 177 | 188 | 145 | 132 |
| 3 GPR | | | | | |
| $MFR_2$ | [g/10 min] | 1.1 | 1.5 | 0.8 | 0.9 |
| C2 content | [wt.-%] | 9.7 | 9.4 | 10.0 | 11.5 |
| XCS | [wt.-%] | 37 | 38 | 43 | 47 |
| C2 of XCS | [wt.-%] | 22.0 | 20.0 | 16.0 | 16.0 |
| IV of XCS | [dl/g] | 3.0 | 2.4 | 2.3 | 2.3 |
| Tm | [° C.] | 150 | 151 | 153 | 152 |
| C2/C3 ratio | [mol/kmol] | 189 | 178 | 133 | 128 |
| split loop | [wt.-%] | 26.5 | 27.7 | 25.8 | 25.2 |
| split GPR1 | [wt.-%] | 36.5 | 35.3 | 42.2 | 44.8 |
| split (GPR2 + GPR3) | [wt.-%] | 37 | 37 | 32 | 30 |
| C2 content produced in GPR1 | [wt.-%] | 8.8 | 2.4 | 11.8 | 12.2 |
| XCS produced in GPR1 | [wt.-%] | 26.8 | 3.4 | 58 | 50 |
| C2 content produced in GPR2 + GPR3 | [wt.-%] | 15.8 | 21.3 | 13.8 | 18.3 |

TABLE 2a

Properties

|  |  | CE1 | CE2 | CE3 |
|---|---|---|---|---|
| Flex Modulus | [MPa] | 439 | 403 | 434 |
| C6-Solubles | [wt.-%] | 11.9 | 18.5 | 13.9 |
| Haze b.s. | [%] | 87 | 50 | 44 |
| Haze a.s. | [%] | — | — | 59 |

TABLE 2b

Properties

|  |  | CE4 | CE5 | E1 | E2 |
|---|---|---|---|---|---|
| Flex Modulus | [MPa] | 442 | 400 | 289 | 235 |
| C6-Solubles | [wt.-%] | 7.9 | 14.1 | 8.8 | 11.4 |
| Haze b.s. | [%] | 59 | 36 | 29 | 25 |
| Haze a.s. | [%] | 71 | 48 | 42 | 37 |

TABLE 3a

Properties on bottles

|  |  | CE1 | CE2 | CE3 |
|---|---|---|---|---|
| Average of drop height (23° C.) | [m] | 5.5 | 5.5 | 5.5 |
| Average of drop height (0° C.) | [m] | 5.5 | 5.5 | 5.5 |
| Before sterilization |  |  |  |  |
| Transparency | [%] | 76 | 72 | 76 |
| Haze | [%] | 88 | 61 | 57 |
| Clarity | [%] | 9 | 54 | 50 |
| Tensile modulus | [MPa] | 447 | 395 | 515 |
| After sterilization |  |  |  |  |
| Transparency | [%] | 70 | 66 | 70 |
| Haze | [%] | 93 | 71 | 64 |
| Clarity | [%] | 9 | 53 | 52 |
| Tensile modulus | [MPa] | 505 | 415 | 457 |

TABLE 3b

Properties on bottles

|  |  | CE4 | CE5 | CE6 | CE7 | E1 | E2 |
|---|---|---|---|---|---|---|---|
| Average of drop height (23° C.) | [m] | 5.5 | 5.5 | 3.5 | 5.5 | — | 5.5 |
| Average of drop height (0° C.) | [m] | 5.5 | 5.5 | 3.5 | 3.0 | — | 5.5 |
| Before sterilization |  |  |  |  |  |  |  |
| Transparency | [%] | 80 | 80 | 92 | 87 | — | 87 |
| Haze | [%] | 65 | 49 | 47 | 34 | — | 40 |
| Clarity | [%] | 30 | 56 | 67 | 89 | — | 47 |
| Tensile modulus | [MPa] | 442 | 380 | 515 | 279 | — | 226 |
| After sterilization |  |  |  |  |  |  |  |
| Transparency | [%] | 75 | 73 | 90 | 85 | — | 79 |
| Haze | [%] | 73 | 56 | 42 | 45 | — | 48 |
| Clarity | [%] | 29 | 61 | 73 | 89 | — | 43 |
| Tensile modulus | [MPa] | 473 | 410 | 737 | 473 | — | 271 |

CE6 is the commercial ethylene propylene random copolymer Bormed RB801CF of Borealis AG
CE7 is the commercial LDPE Bormed LE6609PH of Borealis AG

The invention claimed is:

1. Molded article comprising a propylene copolymer having:
   (a) a xylene cold soluble content (XCS) determined according ISO 16152 (25° C.) in the range of 35 to 60 wt. %,
   (b) a comonomer content in the range of 7.0 to 17.0 wt. %,
   wherein further the propylene copolymer fulfills inequation (I):

$$\frac{Co\ (total)}{Co\ (XCS)} \geq 0.50$$

wherein Co (total) is the comonomer content [wt. %] of the propylene copolymer,
   Co (XCS) is the comonomer content [wt. %] of the xylene cold soluble fraction (XCS) of the propylene copolymer, and
   wherein the propylene copolymer is a heterophasic propylene copolymer (RAHECO) comprising a matrix (M) and an elastomeric propylene copolymer (E) dispersed in said matrix (M), wherein said matrix (M) is a random propylene copolymer (R-PP) having a comonomer content of at least 4.0 wt. %.

2. Molded article according to claim 1, wherein the comonomer content of xylene cold soluble (XCS) fraction of the propylene copolymer is in the range of 8.0 to 20.0 wt. %.

3. Molded article according to claim 1, wherein the amount of the propylene copolymer in the molded article is at least 50 wt. % based on the total weight of the molded article.

4. Molded article according to claim 1, wherein the propylene copolymer comprises:
   (a) a melting temperature Tm determined by differential scanning calorimetry (DSC) in the range of 145 to 160° C., and/or
   (b) an intrinsic viscosity (IV) of the xylene cold soluble (XCS) fraction determined according to DIN ISO 1628/1 (in Decalin at 135° C.) in the range of 1.5 to below 2.8 dl/g.

5. Molded article according to claim 1, wherein the propylene copolymer has a melt flow rate $MFR_2$ (230° C.) measured according to ISO 1133 in the range of 0.5 to 2.5 g/10 min.

6. Molded article according to claim 1, wherein the propylene copolymer comprises:
   (a) a flexural modulus measured according to ISO 178 of not more than 350 MPa, and/or
   (b) a haze before sterilization determined according to ASTM D 1003-07 of below 30%, and/or
   (c) a haze after sterilization determined according to ASTM D 1003-07 of below 50%.

7. Molded article according to claim 1, wherein the weight ratio between the matrix (M) and the elastomeric propylene copolymer (E) is 50/50 to 80/20.

8. Molded article according to claim 1, wherein,
   (a) the comonomer content of the random propylene copolymer (R-PP) is in the range of 4.0 to 15.0 wt.-%, and/or
   (b) the propylene copolymer fulfills inequation (II):

$$\frac{Co\ (total)}{Co\ (RPP)} \geq 0.9$$

wherein
   Co (total) is the comonomer content [wt. %] of the propylene copolymer, and
   Co (RPP) is the comonomer content [wt. %] of the random propylene copolymer (R-PP), and/or
   (c) the random propylene copolymer (R-PP) has a xylene cold soluble (XCS) fraction in the range of 20 to 45 wt. %.

9. Molded article according to claim 1, wherein the random propylene copolymer (R-PP) of the heterophasic propylene copolymer (RAHECO) comprises at least two different fractions, a first random propylene copolymer fraction (R-PP1) and a second random propylene copolymer fraction (R-PP2), wherein further:
   (a) the weight ratio between the first random propylene copolymer fraction (R-PP1) and the second random propylene copolymer fraction (R-PP2) 20/80 to 80/20, and/or
   (b) the first random propylene copolymer fraction (R-PP1) has a comonomer content in the range 0.5 to 5.0 wt. %, and/or (c) the second random propylene copolymer fraction (R-PP2) has a comonomer content in the range 7.0 to 20.0 wt. %.

10. Molded article according to claim 1, wherein the elastomeric propylene copolymer (E) of the heterophasic propylene copolymer (RAHECO) has a comonomer content in the range of 10.0 to 22.0 wt. %.

11. Molded article according to claim 1, wherein the article is a blow molded article.

12. Molded article according to claim 1, wherein the article is a bottle.

13. Molded article comprising a propylene copolymer having:
   (a) a xylene cold soluble content (XCS) determined according ISO 16152 (25° C.) in the range of 35 to 60 wt. %, and
   (b) a comonomer content in the range of 7.0 to 17.0 wt. %,
   wherein further the comonomer content of xylene cold soluble (XCS) fraction of the propylene copolymer is in the range of 8.0 to 20.0 wt. %, and
   wherein the propylene copolymer is a heterophasic propylene copolymer (RAHECO) comprising a matrix (M) and an elastomeric propylene copolymer (E) dispersed in said matrix (M), wherein said matrix (M) is a random propylene copolymer (R-PP) having a comonomer content of at least 4.0 wt. %.

14. Molded article according to claim 13, wherein the propylene copolymer fulfills inequation (I):

$$\frac{Co\ (total)}{Co\ (XCS)} \geq 0.50$$

wherein Co (total) is the comonomer content [wt. %] of the propylene copolymer, and Co (XCS) is the comonomer content [wt. %] of the xylene cold soluble fraction (XCS) of the propylene copolymer.

* * * * *